United States Patent [19]

Weaver et al.

[11] Patent Number: 4,808,677

[45] Date of Patent: Feb. 28, 1989

[54] CONDENSATION POLYMER CONTAINING COPOLYMERIZED COLORANTS DERIVED FROM INDIGO AND ARTICLES PRODUCED THEREFROM

[75] Inventors: Max A. Weaver; Clarence A. Coates, Jr.; Wayne P. Pruett, all of Kingsport; Samuel D. Hilbert, Jonesborough, all of Tenn.

[73] Assignee: Eastman Kodak Company, Rochester, N.Y.

[21] Appl. No.: 153,635

[22] Filed: Feb. 8, 1988

[51] Int. Cl.$^4$ .............................................. C08G 63/20
[52] U.S. Cl. .................................... 525/437; 525/447; 525/445; 525/467
[58] Field of Search ................ 528/201, 289; 525/445, 525/447, 437, 467

[56] References Cited

U.S. PATENT DOCUMENTS

| | | | |
|---|---|---|---|
| 2,571,319 | 10/1951 | Waters et al. | 18/54 |
| 3,372,138 | 3/1968 | Bowman et al. | 260/40 |
| 4,359,570 | 11/1982 | Davis et al. | 528/289 |
| 4,403,092 | 9/1983 | Davis et al. | 528/290 |

OTHER PUBLICATIONS

Chemical Abstracts: 17:1232–Posner et al, Ber. 56 B, 31 (1923).
Chemical Abstracts: 19:280–Posner et al, Ber. 57 B, 1311 (1924).
Chemical Abstracts: 21:87–Posner, Ber. 59 B, 1799 (1926).

*Primary Examiner*—Maurice J. Welsh
*Assistant Examiner*—L. Henderson
*Attorney, Agent, or Firm*—J. Frederick Thomsen; William P. Heath, Jr.

[57] ABSTRACT

Disclosed are colored compositions useful for molding into articles such as food containers, beverage bottles, cured structural plastics and the like comprising condensation polymer having reacted therewith or copolymerized therein a coloring amount of the residue of a colorant compound having the formula;

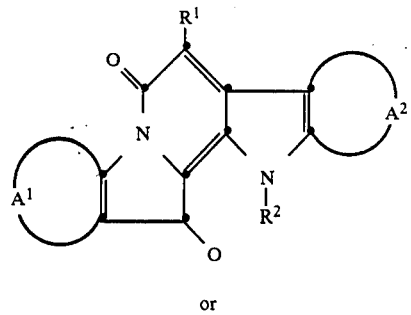

or

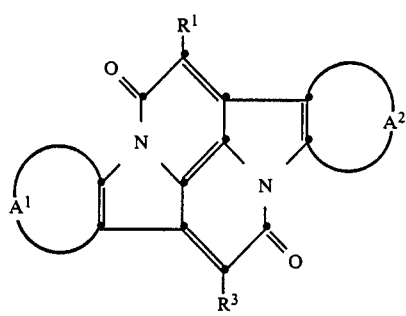

wherein
$R^1$ is

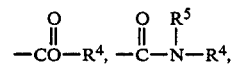

carbonyl halide or an unsubstituted or substituted carbocyclic or hetrocyclic aryl radical;
$R^2$ is hydrogen or an unsubstituted or substituted alkyl or acyl radical;
$R^3$ is any of the substituents which $R^1$ may represent; and
$A^1$ and $A^2$ each is the residue of a fused benzene ring; wherein
$R^4$ is hydrogen, allyl or an unsubstituted or substituted alkyl, cycloalkyl or aryl radical; and
$R^5$ is hydrogen or an unsubstituted or substituted alkyl, cycloalkyl or aryl radical; provided the colorant compound bears at least one substituent that is reactive with one of the monomers from which the condensation polymer is derived.

The colorant compound residues are present in the polymer chain and impart a red color to the polymer. The residues are nonextractable from the polymer and stable at the condition at which the polymers are prepared and processed.

12 Claims, No Drawings

CONDENSATION POLYMER CONTAINING COPOLYMERIZED COLORANTS DERIVED FROM INDIGO AND ARTICLES PRODUCED THEREFROM

This invention concerns novel compositions comprising a condensation polymer such as a linear polyester, nonsaturated polyester or polycarbonate colored by means of certain colorant compounds derived from indigo and reacted or copolymerized with the condensation polymer. The indigo derivatives described in detail hereinbelow impart red color to the condensation polymer and do not decompose or sublime at the temperature at which the condensation polymers are prepared and processed. Since the colorant compounds are chemically bonded to and are thus an integral part of the polymer, the compounds are not extractable from the polymer which renders the colored polymer compositions particularly useful as containers for foods, beverages, pharmaceuticals and cosmetics. The polymer compositions also may be used in the manufacture of colored fibers.

Certain of the colorant compounds derived from indigo or substituted indigo compounds and described hereinafter are known compounds, having been prepared by Posner et al., Ber. 56B, 31–34 (1923; C.A. 17:1232); Posner et al., Ber. 57B, 1311–1315 (1924; C.A. 19:280); and Posner, Ber. 59B, 1799–1827 (1926; C.A. 21:87). Posner et al. suggested that the compounds prepared could be used as red vat dyes similar to indigo. It is known that colorant compounds having various structure bearing one or more reactive or condensible groups can be reacted or copolymerized with condensation polymers. See, for example, U.S. Pat. Nos. 3,372,138, 4,359,570 and 4,403,092. However, the literature does not disclose the use of the colorant compounds derived from indigo as reactive or copolymerizable colorants for condensation polymers. Furthermore, the literature does not indicate that the indigo derivatives possess the requisite thermal stability which permits their reaction with or copolymerization into condensation polymers. Indigo itself is not thermally stable under polyester-forming conditions and decomposes to a brown color.

The novel compositions provided by this invention comprise molding or fiber-grade condensation polymer having reacted therewith or copolymerized therein a coloring amount of the residue of a colorant compound having the formula:

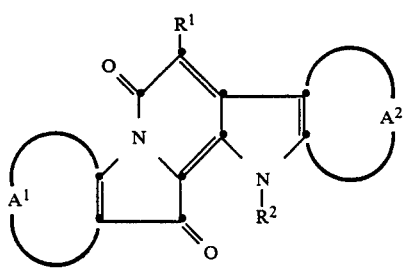

or

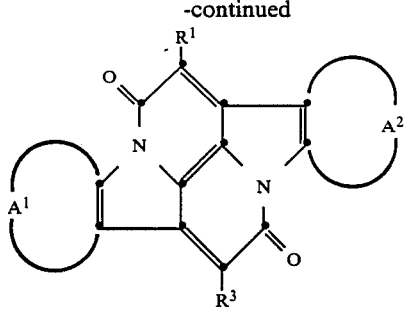

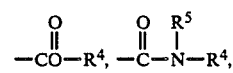

$R^1$ is carbonyl halide or an unsubstituted or substituted carbocyclic or hetrocyclic aryl radical;

$R^2$ is hydrogen or an unsubstituted or substituted alkyl or acyl radical;

$R^3$ is any of the substituents which $R^1$ may represent; and $A^1$ and $A^2$ each is the residue of a fused benzene ring; wherein $R^4$ is hydrogen, allyl or an unsubstituted or substituted alkyl, cycloalkyl or aryl radical; and $R^5$ is hydrogen or an unsubstituted or substituted alkyl, cycloalkyl or aryl radical; provided the colorant compound bears at least one substituent that is reactive with one of the monomers from which the condensation polymer is derived.

The alkyl radicals which $R^2$, $R^4$ and $R^5$ represent may be unsubstituted or substituted alkyl of up to about 12 carbon atoms. Hydroxy, alkoxy, carboxy, halogen, alkanoyloxy, alkoxycarbonyl, cyano, aryl, aryloxy, cycloalkyl, cycloalkoxy, alkylthio, amino, alkylamino and acylamido are examples of the substituents which may be present on the substituted alkyl radicals. The cycloalkyl radicals may contain from 5 to 7 carbon atoms and may be unsubstituted or substituted with alkyl and/or one or more of the substituents described above.

The aryl groups recited in the definitions of $R^1$, $R^4$ and $R^5$ can be unsubstituted or substituted carbocyclic or hetercyclic aryl containing about 5 to 12 carbon atoms. Examples of the carbocyclic aryl groups include phenyl, naphthyl and phenyl and naphthyl substituted with up to three groups such as alkyl and the substituents set forth in the preceding paragraph. Pyrolyl, pyridyl, pyrimidyl, 2-benzothiazolyl, 2-benzoxazolyl, 2-benzimidazolyl, 2-thienyl, 2-furanyl, 1, 3, 4-thiadiazol-2-yl, 1,2,4-thiadiazol-2-yl and groups having the structure:

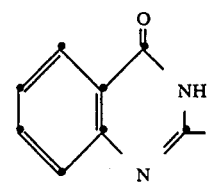

are examples of the unsubstituted aromatic heterocyclic residues which each $R^1$, $R^4$ and $R^5$ may represent.

The acyl radical which $R^2$ may represent can be carboxylic acyl such as the acyl residues having the formula

and

carbamic acyl such as groups having the formula

sulfonic acyl such as the groups having the formula $-SO_2-R^4$, or sulfamic acyl such as the groups having the formula

wherein $R^4$ and $R^5$ are defined hereinabove.

The benzene residue, i.e., a 1,4-butadienyl radical, representd by $A^1$ and $A^2$ may be unsubstituted or substituted with up to 3 substituents selected from alkyl, alkoxy and halogen. The fused benzene residues represented by $A^1$ and $A^2$ are illustrated by the structure:

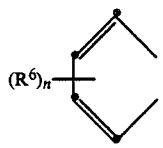

wherein $R^6$ is alkyl, alkoxy or halogen and n is 0, 1, 2 or 3.

As stated hereinabove, the colorant compounds of formula (I) and (II) must bear or contain at least one substituent that is reactive with one of the monomers from which the condensation polymer is derived. Examples of such reactive substituents include carbonyl halides such as carbonyl chloride, carboxy, alkoxycarbonyl, alkenyloxycarbonyl, cycloalkoxycarbonyl, aryloxycarbonyl, amino, hydroxy, esterified hydroxy, i.e., acyloxy, groups such as carboxylic acid esters, e.g., alkanoyloxy, cycloalkanoyloxy and aroyloxy, carbamic acid esters, e.g., N-alkyl-carbamoyloxy and N-arylcarbamoyloxy and carbonate esters, e.g., ethoxycarbonyloxy. The residue of the colorant compound may be incorporated into or on the polymer chain by reacting one or more colorant compounds of formulas (I) and (II) with the monomers, with a prepolymer or with the final polymer. As those skilled in the art will appreciate, when the reactive substituent or substituents are alkoxycarbonyl, alkenyloxycarbony, cycloalkoxycarbonyl, aryloxycarbonyl, or acyloxy, the alkyl, alkenyl, cycloalkyl and aryl residues and the acid residues of the acyloxy substituents are displaced or removed from the colorant compound upon reaction with the polymer or polymer precursor. Thus, those residues are not important to the colorant residue component of our novel compositions.

The residue of the colorant compound present in our novel polymer compositions preferably is derived from a compound having the formula:

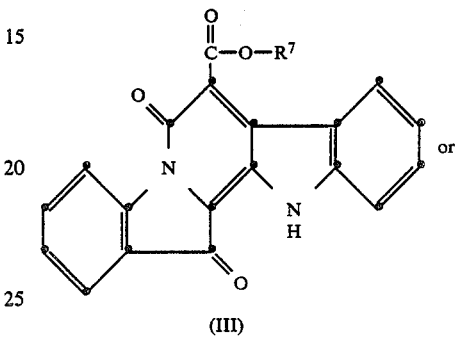

or

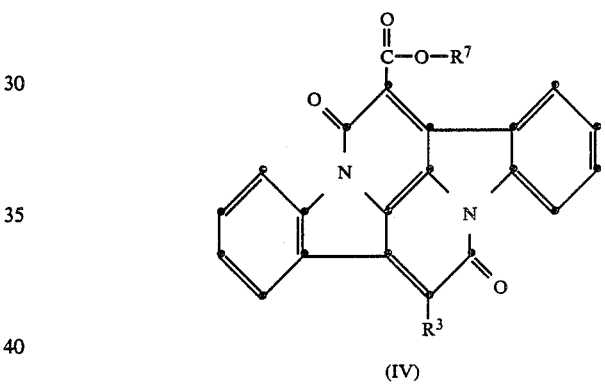

wherein $R^7$ is lower alkyl, i.e., alkyl of up to 6 carbon atoms, and $R^3$ is phenyl or phenyl substituted with lower alkyl or lower alkoxycarbonyl.

Compounds (I) wherein $R^2$ is hydrogen may be prepared according to the procedure reported by Posner by reacting indigo or a substituted indigo with a substituted acetate ester or a substituted acetyl chloride in the presence of a small amount of base:

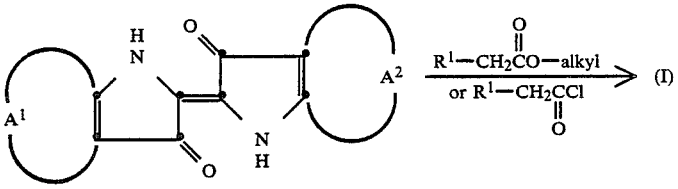

For example, the colorant compound prepared by reacting indigo with diethyl malonate ($R^1$=ethoxycarbonyl, $R^2$=hydrogen) has a visible absorption maximum ($\lambda$max) at 542 mm in acetone and an extinction coefficient of 13,443. Compounds (I) wherein $R^1$ is a carbonyl halide group can be prepared by hydrolyzing the ethoxycarbonyl group and treating the resulting compound with a halogenating agent. The carbonyl halide-substituted compounds can be reacted with various amines to obtain compounds wherein $R^1$ is a carbamoyl radical. The compounds of formula (I) wherein $R^2$ is an alkyl or acyl radical can be obtaining by reacting the corresponding N-unsubstituted compounds with alkylating or acylating agents such as alkyl and aralkyl bromides, carboxylic acid chlorides and alkyl chloroformates.

Compounds of formula (II) can be prepared by reacting compounds (I) with a substituted acetyl chloride having the formula

Compound (II) wherein $R^1$ is ethoxycarbonyl and $R^3$ is phenyl is obtained by reacting compound (I) wherein $R^1$ is ethoxycarbonyl and $R^2$ is hydrogen with phenylacetyl chloride. The compound (II) thus prepared has an extinction coefficient of 21,556 atg 541 nm in methylene chloride.

The polyesters which may be used in the preparation of the compositions of our invention include linear, thermoplastic, crystalline or amorphous polyesters produced by conventional polymerization techniques from one or more diols and one or more dicarboxylic acids. The polyesters normally are molding or fiber grade and have an inherent viscosity (I.V.) of about 0.4 to about 1.2. The preferred polyesters comprise at least about 50 mole percent terephthalic or 2,6-naphthalenedicarboxylic acid residues and at least about 50 mole percent ethylene glycol and/or 1,4-cyclohexanedimethanol residues. Particularly preferred polyesters are those containing from about 75 to 100 mole percent terephthalic or 2,6-naphthalenedicarboxylic acid residues and from about 75 to 100 mole percent ethylene glycol residues.

The unsaturated, curable polyesters which may be used in our novel compositions are the polyesterification products of one or more glycols and one or more unsaturated dicarboxylic acids or their anhydrides. Typical of the unsaturated polyesters is the polyesterification product of (a) 1,4-cyclohexanedimethanol and/or 2,2-dimethyl-1,3-propanediol and optionally an additional dihydric alcohol, such as ethylene glycol, and (b) maleic acid or fumaric acid and an aromatic dicarboxylic acid, which when crosslinked with an ethylenically-unsaturated monomer, e.g., styrene, produces a cured polyester resin which has, for example, high thermal resistance, high heat distortion values, excellent electrical and mechanical properties, and excellent resistance to chemicals.

Solutions of such unsaturated polyester resins in an ethylenically-unsaturated monomer such as styrene commonly are referred to as polyester resins.

The unsaturated polyester resins may be prepared in the presence of gelatin inhibitors such as hydroquinone or the like, which are well known in the art of polyesterification. The esterification may be carried out, for example, under an inert blanket of gas such as nitrogen in a temperature range of 118°-220° C. for a period of about 6-20 hours until an acid number below 100 and preferably below 50 is obtained, based on milliequivalents of KOH necessary to neutralize 1 gram of the unsaturated polyester. The resulting polyester may be subsequently copolymerized, cross-linked, or cured with "curing amounts" of any of the well-known ethylenically unsaturated monomers used as solvents for the polyester. Examples of such monomers include styrene, alpha-methyl styrene, vinyl toluene, divinyl benzene, chlorostyrene, and the like as well as mixtures thereof. Typically, the mole ratio of such unsaturated monomer to the unsaturated moiety (e.g., maleic acid residue) in the polyester is from about 0.5 to about 3.0, although the "curing amounts" of such monomer can be varied from these ratios.

It is preferred that the unsaturated polyester be prepared from one or more dihydric alcohols, fumaric or maleic acid or mixtures thereof, and up to about 60 mole percent of total acid component of o-phthalic, isophthalic or terephthalic acids or mixtures thereof. Preferred for the dihydric alcohol component is one or a mixture of propylene glycol, neopentyl glycol, 2,2,4-trimethyl-1,3-pentanediol, ethylene glycol, or diethylene glycol. A specific preferred unsaturated polyester is prepared from about 75 to 100 mole percent propylene glycol, and as the acid component, from about 75 to 100 mole percent o-phthalic and maleic acids in a mole ratio of from about ½ to about 2/1. Typical of these unsaturated polyesters are those disclosed, for example, in U.S. Pat. No. 4,359,570 incorporated herein by reference.

The diol components of the described polyesters may be selected from ethylene glycol, 1,4-cyclohexanedimethanol, 1,2-propanediol, 1,3-propanediol, 1,4-butanediol, 2,2-dimethyl-1,3-propanediol, 1,6-hexanediol, 1,2-cyclohexanediol, 1,4-cyclohexanediol, 1,2-cyclohexanedimethanol, 1,3-cyclohexanedimethanol, X,8-bis(hydroxymethyl)-tricyclo-[5.2.1.0]-decane wherein X represents 3, 4, or 5; and diols containing one or more oxygen atoms in the chain, e.g., diethylene glycol, triethylene glycol, dipropylene glycol, tripropylene glycol and the like. In general, these diols contain 2 to 18, preferably 2 to 8 carbon atoms. Cycloaliphatic diols can be employed in their cis or trans configuration or as mixtures of both forms.

The acid components (aliphatic, alicyclic, or aromatic dicarboxylic acids) of the linear polyester are selected, for example, from terephthalic acid, isophthalic acid, 1,4-cyclohexanedicarboxylic acid, 1,3-cyclohexanedicarboxylic acid, succinic acid, glutaric acid, adipic acid, sebacic acid, 1,12-dodecanedioic acid, 2,6-naphthalene-dicarboxylic acid and the like. In the polymer preparation, it is often preferable to use a function acid derivative thereof such as the dimethyl, diethyl, or dipropyl ester of the dicarboxylic acid. The anhydrides or acid halides of these acids also may be employed where practical.

Typical polycarbonates useful herein are disclosed in Kirk-Othmer Encyclopedia of Chemical Technology, third edition, Volume 18, pages 479-494, incorporated herein by reference.

The novel polymer compositions provided by this invention are useful in the manufacture of containers or packages for comestibles such as beverages and food. The use of polymeric materials in the packaging of comestibles is permissible only if none or essentially none of the colorant in the polymer is extracted by solvents such as acids, alcohols and the like present in the food or beverage. Furthermore, the colorant must not decompose at the polymer processing temperatures to avoid discoloration of the polymer.

By the use of known heat-setting techniques, certain of the polyesters are, in terms of color, I.V. and heat distortion, stable at temperatures up to about 100° C. Such stability characteristics are referred to herein as "hot-fill" stability. Articles molded from these polyesters exhibit good thin-wall rigidity, excellent clarity and good barrier properties with respect to moisture and atmospheric gases, particularly carbon dioxide and oxygen.

The linear polyesters most preferred for use in articles having "hot-fill" stability comprise poly-ethylene terephthalate), poly(ethylene terephthalate) wherein up to 5 mole percent of the ethylene glycol residues have been replaced with residues derived from 1,4-cyclohexanedimethanol and poly(ethylene 2,6-naphthalenedicarboxylate), wherein the polyesters have been sufficiently heat set and oriented by methods well known in the art to give a desired degree of crystallinity. By definition, a polymer is "hot-fill" stable at a prescribed temperature when less than 2% change in volume of a container manufactured therefrom occurs upon filling the same with a liquid at the temperature. For the manufacture of blow-molded beverage bottles, the most preferred polyesters have an I.V. of 0.65 to 0.85, and a Tg of <70° C., and film sections cut from the bottle have a Water Vapor Transmission Rate of 1.5 to 2.5 g mils/100 in.$^2$ -24 hours, a Carbon Dioxide Permeability of 20–30 cc. mils/100 in.$^2$ -24 hours -atm., and an Oxygen Permeability of 4–8 cc. mils/100 in.$^2$ -24 hours -atm. The Tg is determined by Differential Scanning Calorimetry at a scan rate of 20 Centigrade Degrees/min., the Oxygen Permeability by the standard operating procedure of a MOCON OXTRAN 100 instrument of Modern Controls, Inc., of Elk River, Minn., and the Carbon Dioxide Permeability by the standard operating procedure of a MOCON PERMATRAN C II, also of Modern Controls.

The concentration of the residue of the colorant compound in the condensation polymer can be varied substantially depending, for example, on the depth of shade desired, the presence or absence of other colorants in the polymer and/or in end use for which the polymer composition is intended. Typically, the concentration of the colorant residue is in the range of about 10 to 100,000 ppm (parts per million by weight based on the weight of the colored polymer). When the polymer is used directly in the manufacture of shaped articles such as fibers or containers for comestibles, the coloring amount of colorant residue normally will be in the range of about 20 to 5,000 ppm.

Polymer compositions containing substantially higher amounts, e.g., from about 2.0 to 10.0 weight percent (20,000 to 100,000 ppm) of the residue of one or more of the colorant compound residues described herein may be used as polymer concentrates. Such concentrates may be blended with the same or different polymer according to conventional procedures to obtain polymer compositions which will contain a predetermined amount of the residue or residues in a nonextractable form. In the preparation of these highly loaded, polymer composition concentrates the residue preferably is divalent and thus is derived from a difunctional colorant compound such as the compound of Example 4.

The preparation of the compositions of our invention are further illustrated by the following examples.

Example 1

The following materials are placed in a 500-mL three-necked, round-bottom flask:

97 g (0.5 mol) dimethyl terephthalate 62 g (1.0 mol) ethylene glycol 0.0087 g Ti from a n-butanol solution of acetyl-triisopropyl titanate 0.0192 g Compound (III) wherein $R^7$ is ethyl The flask is equipped with a nitrogen inlet, stirrer, vacuum outlet, and condensing flask. The flask and contents are heated at 200° C. in a Belmont metal bath for 60 minutes, at 210° C. for 75 minutes and at 230° C. for 50 minutes with a nitrogen sweep over the reaction mixture. The metal bath temperature is increased to 270° C. and a vacuum with a slow stream of nitrogen bleeding in the system is applied over a ten-minute period until the pressure is reduced to 100 mm Hg. The flask and contents are heated at 270° C. under a pressure of 100 mm Hg for 30 minutes. The metal bath temperature is incrased to 285° C. and the pressure is reduced slowly to 4.5 mm Hg over a ten-minute period. The flask and contents are heated at 285° C. under pressure of 4.5 mm Hg for 25 minutes. Then the pressure is reduced to 0.3 mm Hg and polycondensation is continued at 285° C. for 16 minutes. The flask is removed from the metal bath and is allowed to cool in a nitrogen atmosphere while the polymer crystallizes. The resulting polymer has an inherent viscosity of 0.67 measured in a 60/40 ratio by weight of phenol/tetrachloroethane at a concentration of 0.5 g per 100 mL. An amorphous 14-mil thick film molded from this polymer to simulate the sidewall of a container exhibits a strong absorption peak at 535 nm.

Example 2

The procedure described in Example 1 is repeated using compound (IV) wherein $R^7$ is ethyl and $R^3$ is phenyl instead of the colorant compound used in Example 1. The resulting polymer is red and has an inherent viscosity of 0.73. An amorphous 14-mil thick film molded from this polymer exhibits strong absorptions at 500 and 535 nm.

Additional examples of the colorants of formulas (I) and (II) useful in the preparation of our novel polymer compositions are set forth in Tables I and II. These colorants may be prepared according to the procedures described hereinabove and conform to the formulas given in each table.

TABLE 1

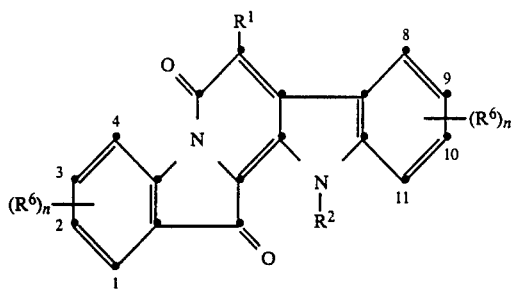

| Ex. | R¹ | R² | (R⁶)ₙ |
|---|---|---|---|
| 3 | —COOCH₃ | H | H |
| 4 | —COOH | H | H |
| 5 | —COOC₂H₅ | H | 1,8-di-Cl |
| 6 | —COOCH₂CH₂OH | H | 2,9-di-Br |
| 7 | —COOCH₂CH₂OCH₃ | H | 1,8-di-CH₃ |
| 8 | —COOCH₂CH₂Cl | C=2,4,9,11-tetra-Br | |
| 9 | —COOCH₂C₆H₅ | H | 4,11-di-CH₃ |
| 10 | —COOCH₂CH₂OC₆H₅ | H | 2,9-di-CH₃ |
| 11 | —COOCH₂C₆H₁₁ | H | 2,9-di-OCH₃ |
| 12 | —COOCH₂C₆H₁₀—4-CH₃ | H | 1,8-di-Cl—2,9-di-Br |
| 13 | —COOCH₂C₆H₁₀—4-CH₂OH | H | H |
| 14 | —COOC₂H₅ | —COC₆H₄—4-COOCH₃ | H |
| 15 | —COOCH₂CH=CH₂ | —SO₂CH₃ | H |
| 16 | —COOCH₂CH₂CN | —SO₂C₆H₄-3-COOCH₃ | H |
| 17 | —COOCH(CH₃)₂ | —COCH₂OH | H |
| 18 | —C₆H₄—4-COOCH₃ | H | H |
| 19 | —C=N—o-C₆H₃—5-(COOCH₃)—S (ring) | H | H |
| 20 | —C=N—o-C₆H₃—5-(COOCH₃)—O (ring) | H | H |
| 21 | —C=NC(CH₃)=C(COOC₂H₅)—S (ring) | H | H |
| 22 | —C=N—o-C₆H₃—5-(COOCH₃)—NH (ring) | H | H |
| 23 | —C=CHCH=C(COOC₂H₅)—S (ring) | H | H |
| 24 | —C=N=C(COOC₂H₅)—S (ring) | H | H |
| 25 | —C=CHCH=C(COOH—NH (ring) | H | H |
| 26 | —C₆H₄—3-COOCH₃ | —CH₃ | H |
| 27 | —C₆H₄—2-COOCH₃ | —CH₂CH₂OH | H |
| 28 | —CONHCH₂CH₂OH | H | H |
| 29 | —CONHC₆H₃—3,5-di-COOCH₃ | H | H |
| 30 | —CONHCH₂CH(OH)CH₂OH | H | H |
| 31 | —COOCH₃ | —CONHC₆H₅ | H |
| 32 | —COOCH₂CH₂OOCOC₂H₅ | —COOC₂H₅ | H |
| 33 | —COOCH₂CH₂OOCN(CH₃)₂ | —CON(CH₃)₂ | H |
| 34 | —CONHCH₂CH₂NH₂ | H | H |
| 35 | —CONHC₆H₄—4-NH₂ | H | H |
| 36 | —CONHC₆H₄—4-NHCH₃ | H | H |
| 37 | —COO(CH₂CH₂O)₂H | H | H |
| 38 | —COOCH₂CH₂SCH₂CH₂OH | H | H |
| 39 | —CONHC₆H₄—4-CH₂CH₂OH | H | H |
| 40 | —CONHC₆H₄—4-OCH₂CH₂OH | H | H |
| 41 | —C=NN=C(COOCH₃)—O (ring) | H | H |

TABLE 1-continued

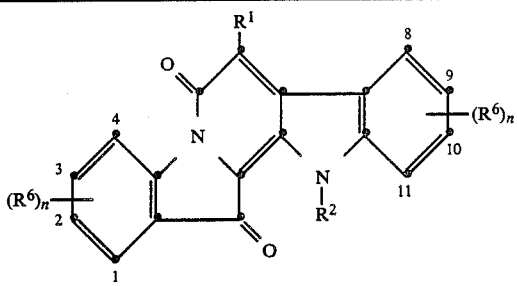

| Ex. | R¹ | R² | $(R^6)_N$ |
|---|---|---|---|
| 42 | —CONHCH$_2$C$_6$H$_{10}$—4-CH$_2$OH | H | H |

TABLE II

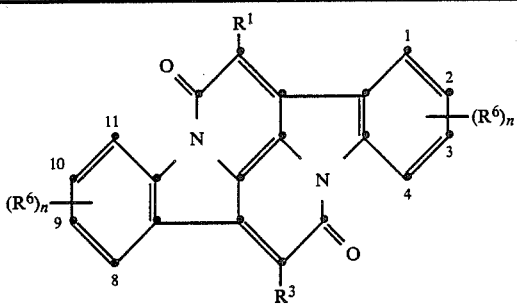

| Ex. | R¹ | R³ | $(R^6)_n$ |
|---|---|---|---|
| 43 | —COOCH$_3$ | —C$_6$H$_5$ | H |
| 44 | —COOH | —C$_6$H$_4$—4-OCH$_3$ | H |
| 45 | —COOC$_2$H$_5$ | —C=N—o-C$_6$H$_3$—5-(COOCH$_3$)—S | H |
| 46 | —COOC$_2$H$_5$ | —C$_6$H$_4$—4-COOCH$_3$ | H |
| 47 | —COOC$_2$H$_5$ | —COOC$_2$H$_5$ | H |
| 48 | —COOC$_2$H$_5$ | —C$_6$H$_4$—4-CH$_3$ | 2,9-di-CH$_3$ |
| 49 | —CONHCH$_2$CH$_2$OH | —C$_6$H$_4$—4-Cl | 2,9-di-Br |
| 50 | —C=N—o-C$_6$H$_3$—5-(COOCH$_3$)—O | —C$_6$H$_5$ | 1,8-di-Cl |
| 51 | —C$_6$H$_4$—4-COOCH$_3$ | —C$_6$H$_4$—4-COOCH$_3$ | H |
| 52 | —COOCH$_2$CH$_2$OH | —C$_6$H$_5$ | H |
| 53 | —COO(CH$_2$CH$_2$O)$_2$H | —C=CHCH=CHS | H |
| 54 | —COOCH$_2$CH(OH)CH$_2$OH | —C=NN=CHO | H |
| 55 | —COOC$_6$H$_{11}$ | —C$_6$H$_4$—2-COOCH$_3$ | H |
| 56 | —COOCH$_2$C$_6$H$_5$ | —C$_6$H$_4$—4-CH$_2$CH$_2$OOCCH$_3$ | H |

The inherent viscosities (I.V.) of the copolyesters described herein are determined according to AST. D2857-10 procedure in a Wagner Viscometer of Lab Glass Inc. of Vineland, N.J., having a ½-mL capillary bulb, using a polymer concentration of 0.5% by weight, in 60/40, by weight, phenol/tetrachloroethane solvent. The procedure comprises heating the polymer/solvent system at 120° C. for 15 minutes to enhance dissolution of the polymer, cooling the solution to 25° C. and measuring the time of flow at 25° C. The I.V. is calculated from the equation:

$$\{\eta\}\ 25°\ C.\ 0.50\% = \frac{\ln \frac{t_s}{t_o}}{C}$$

where:

$\{n\}$ = Inherent viscosity at 25° C. at a polymer concentration of 0.5 g/100 mL of solvent;
ln = Natural logarithm;
$t_s$ = Sample flow time;
$t_o$ = Solvent-blank flow time; and C=Concentration of polymer in grams per 100 mL of solvent=0.50

The nonextractabilities of the colorant residues described herein are determined as follows:

All extractions are done in glass containers with distilled solvents under the time and temperature conditions decribed below. The sample form is ½ inch×2½ inch segments cut from the cylindrical side wall portion of 2-liter bottles. All samples are washed with cold solvent to remove surface contaminants and are exposed using 200 mL solvent 100 in.² surface area (2 mL/in.²).

Solvent blanks are run under the same extraction conditions without polymer. In most cases samples were extracted, spiked with a known amount of additive as a control, and analyzed in duplicates. The solvents employed and the extraction conditions for each solvent are:

1. Water. The samples at room temperature are added to solvent and heated at 250° F. for 2 hours. Half of the samples are then analyzed and the remainder are placed in a 120° F. oven for 30 days and then analyzed.

2. 50% Ethanol/Water. The samples at room temperature are added to the solvent at room temperature, placed in an oven at 120° F. and analyzed after 24 hours. Another set of samples is aged for 30 days at 120° F. and then analyzed.

3. Heptane. The samples at room temperature are added to solvent at room temperature and heated at 150° F. for 2 hours. Part of the samples are cooled to room temperature and analyzed spectrophtometrically and the remainder are allowed to age at 120° F. for 30 days before analysis.

Any suitable analytical technique and apparatus may be employed to determine the amount of colorant residue extracted from the polymer.

The invention has been described in detail with particular reference to preferred embodiments thereof, but it will be understood that variations and modifications can be effected within the spirit and scope of the invention.

We claim:

1. A composition comprising molding or fiber grade condensation polymer having reacted therewith or copolymerized therein a coloring amount of the residue of a colorant compound having the formula:

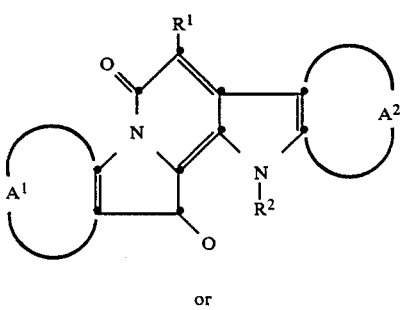

or

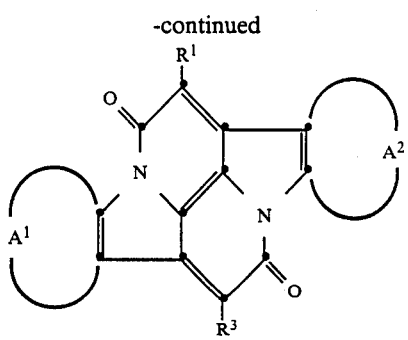

wherein $R^1$ is

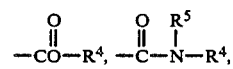

carbonyl halide or an unsubstituted or substituted carbocyclic or hetrocyclic aryl radical;

$R^2$ is hydrogen or an unsubstituted or substituted alkyl or acyl radical;

$R^3$ is any of the substituents which $R^1$ may represent; and $A^1$ and $A^2$ each is the residue of a fused benzene ring; wherein $R^4$ is hydrogen, allyl or an unsubstituted or substituted alkyl, cycloalkyl or aryl radical; and $R^5$ is hydrogen or an unsubstituted or substituted alkyl, cycloalkyl or aryl radical; provided the colorant compound bears at least one substituent that is reactive with one of the monomers from which the condensation polymer is derived.

2. The composition of claim 1 wherein the polymer is a linear polyester containing 20 to 5,000 ppm of the residue of the colorant compound.

3. The composition of claim 1 wherein the polymer is a linear polyester having reacted therewith or copolymerized therein 20 to 5,000 ppm of the residue of a colorant compound having the formula:

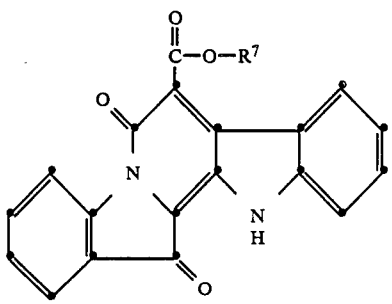

wherein $R^7$ is lower alkyl.

4. The composition of any of claim 1 through 3 wherein the polymer is a linear polyester comprising at least about 75 to 100 mole percent terephthalic or 2,6-naphthalenedicarboxylic acid and from about 75 to 100 mole percent ethylene glycol residue.

5. The composition of claim 1 wherein the polymer is a linear polyester having reacted therewith or copolymerized therein 20 to 5,000 ppm of the residue of a colorant compound having the formula:

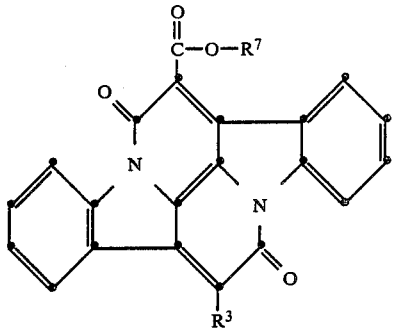

wherein R⁷ is lower alkyl; and R³ is phenyl or phenyl substituted with lower alkyl or lower alkoxycarbonyl.

6. The composition of claim 5 wherein the polymer is a linear polyester comprising at least about 75 to 100 mole percent terephthalic or 2,6-naphthalenedicarboxylic acid and from about 75 to 100 mole percent ethylene glycol residue.

7. A shaped article of the composition of claim 1.
8. A shaped article of the composition of claim 3.
9. A shaped article of the composition of claim 5.
10. A composition according to claim 1 wherein the polymer is a linear polyester having reacted therein or copolymerized therein about 2.0 to 10.0 weight percent of the residue of the colorant compound.
11. The composition of claim 1 wherein the polymer is unsaturated polyester having an acid moiety comprised of fumaric or maleic acid or mixtures thereof and up to about 60 mol % of one or a mixture of o-phthalic, iso-phthalic, or terephthalic acids, and having a glycol moiety comprised of one or a mixture of propylene glycol, neopentyl glycol, 2,2,4-trimethyl-1,3-pentanediol, ethylene glycol or diethylene glycol.
12. The composition of claim 11 wherein the acid moiety is comprised of from about 75 to 100 mol % o-phthalic acid and maleic acid in a mole ratio of from about 1/2 to about 2/1, and the glycol moiety is comprised of from about 75 to 100 mol % propylene glycol.

* * * * *